United States Patent
Parker

(10) Patent No.: US 6,461,400 B1
(45) Date of Patent: Oct. 8, 2002

(54) PROCESS FOR EXTRACTING QUANTITIES OF PRECIOUS METALS

(76) Inventor: Art J. Parker, 6698 Mesquite Ave., 29 Palms, CA (US) 92277

( * ) Notice: Subject to any disclaimer, the term of this patent is extended or adjusted under 35 U.S.C. 154(b) by 0 days.

(21) Appl. No.: 09/547,503

(22) Filed: Apr. 12, 2000

(51) Int. Cl.[7] .............................. C22B 7/00; C22B 11/00
(52) U.S. Cl. ....................... 75/10.14; 75/10.59; 75/414; 75/631
(58) Field of Search .......................... 75/10.14, 10.59, 75/631, 414

(56) References Cited

U.S. PATENT DOCUMENTS

| | | |
|---|---|---|
| 246,690 A | 9/1881 | Robinson |
| 519,129 A | 5/1894 | Lang |
| 744,992 A | 11/1903 | Bailey et al. |
| 815,614 A * | 3/1906 | Meyer ........................ 75/631 |
| 1,763,435 A | 6/1930 | Lindblad |
| 4,015,069 A | 3/1977 | Owen |
| 4,071,228 A | 1/1978 | Tokunaga et al. |
| 4,135,923 A | 1/1979 | Day |
| 4,451,290 A | 5/1984 | Hill et al. |
| 4,685,963 A | 8/1987 | Saville |
| 4,695,317 A | 9/1987 | Kimura et al. |
| 4,814,003 A | 3/1989 | Bergner |
| 4,892,631 A * | 1/1990 | White ........................ 75/10.62 |
| 5,238,485 A * | 8/1993 | Shubert ........................ 75/421 |
| 5,421,857 A * | 6/1995 | Marteanenko et al. ........ 75/707 |
| 5,439,503 A | 8/1995 | Burr |
| 5,536,294 A | 7/1996 | Gill et al. |
| 6,231,638 B1 * | 5/2000 | Janz et al. ..................... 75/378 |

FOREIGN PATENT DOCUMENTS

| | | | |
|---|---|---|---|
| JP | 63111134 A * | 5/1988 | ................. 423/510 |

* cited by examiner

*Primary Examiner*—Roy King
*Assistant Examiner*—Tima McGuthy-Banks
(74) *Attorney, Agent, or Firm*—TraskBritt

(57) ABSTRACT

A method of extracting amounts of precious metals from target materials. The target material in particulate form is mixed with particulate copper and coarse-ground wheat flour and roasted at least once in an induction furnace. The roasted mixture is transformed into particulate form and may be re-roasted with additional flour or roasted in a hydrogen furnace, after which it is again transformed into particulate form, mixed with borax and smelted. The result of the smelt contains amounts of precious metals economically recoverable through conventional refining processes, such as electrical-refining.

65 Claims, 7 Drawing Sheets

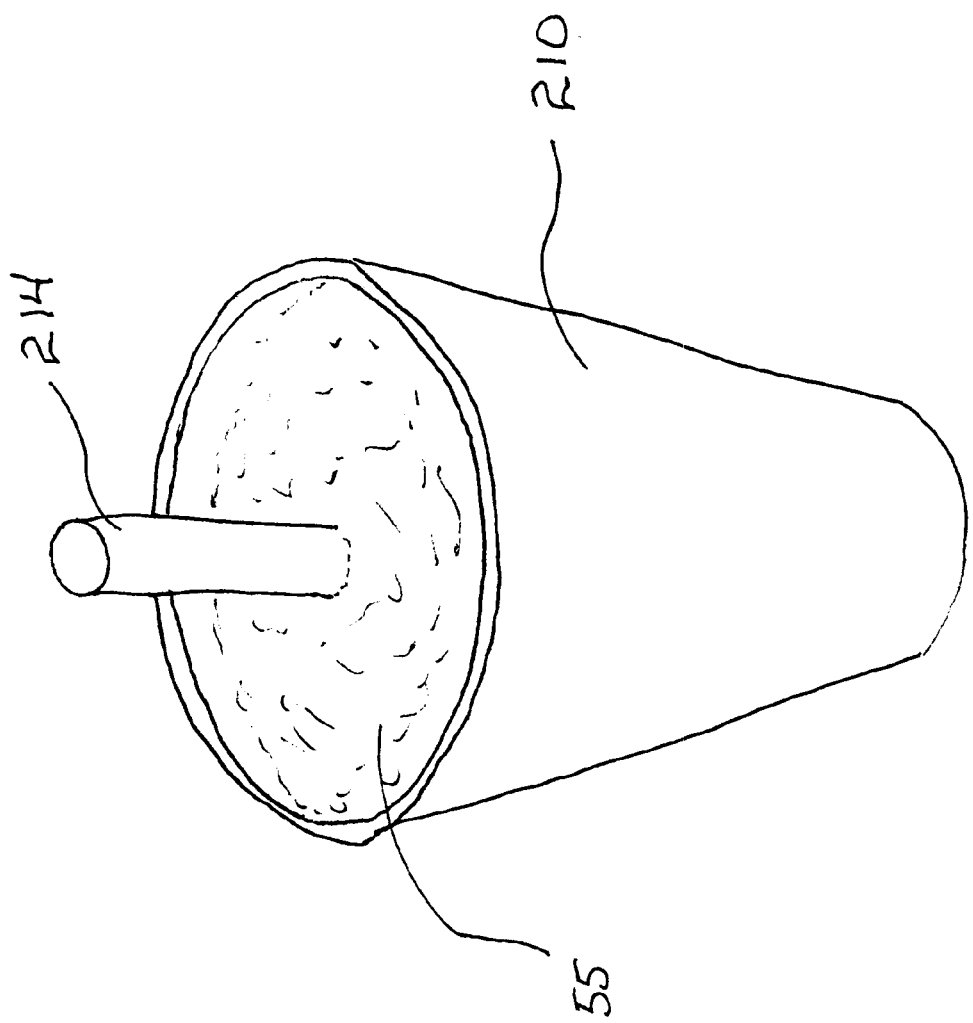

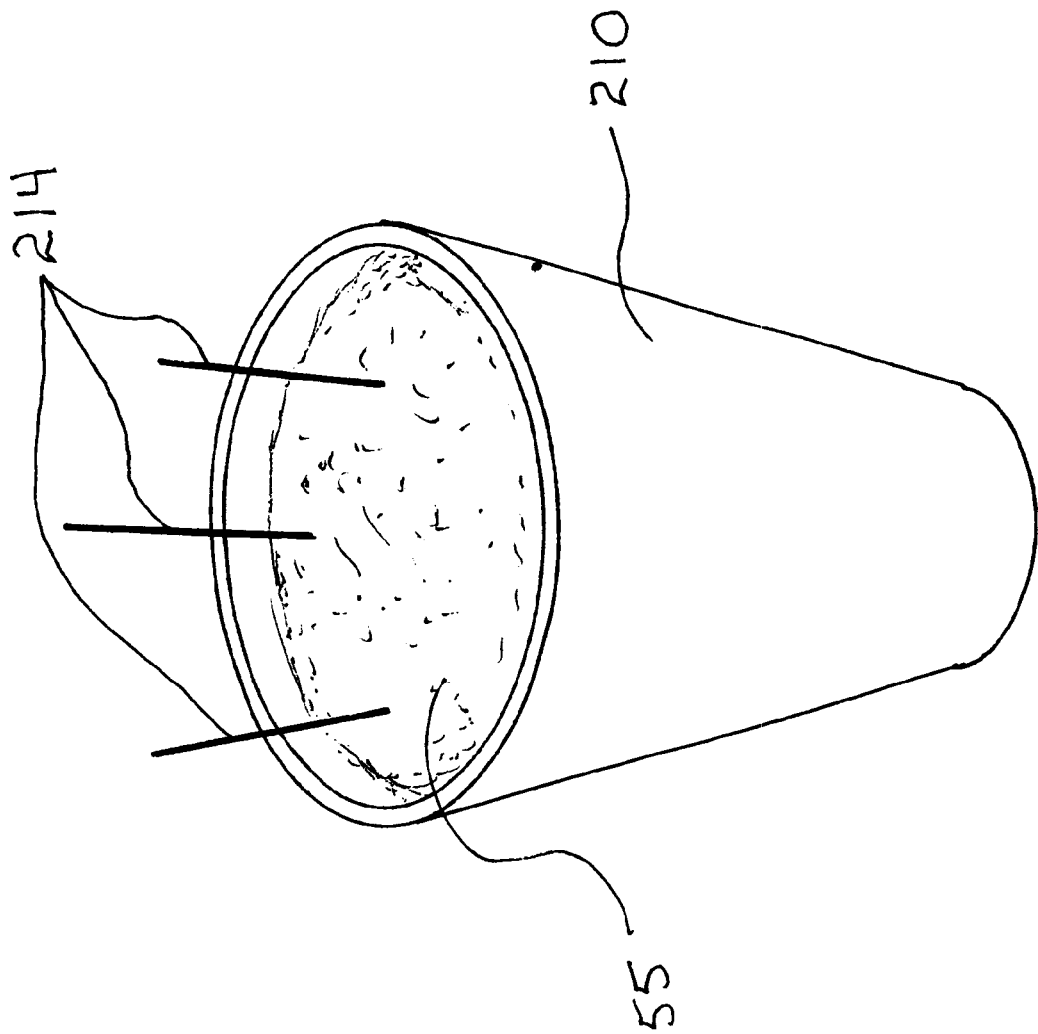

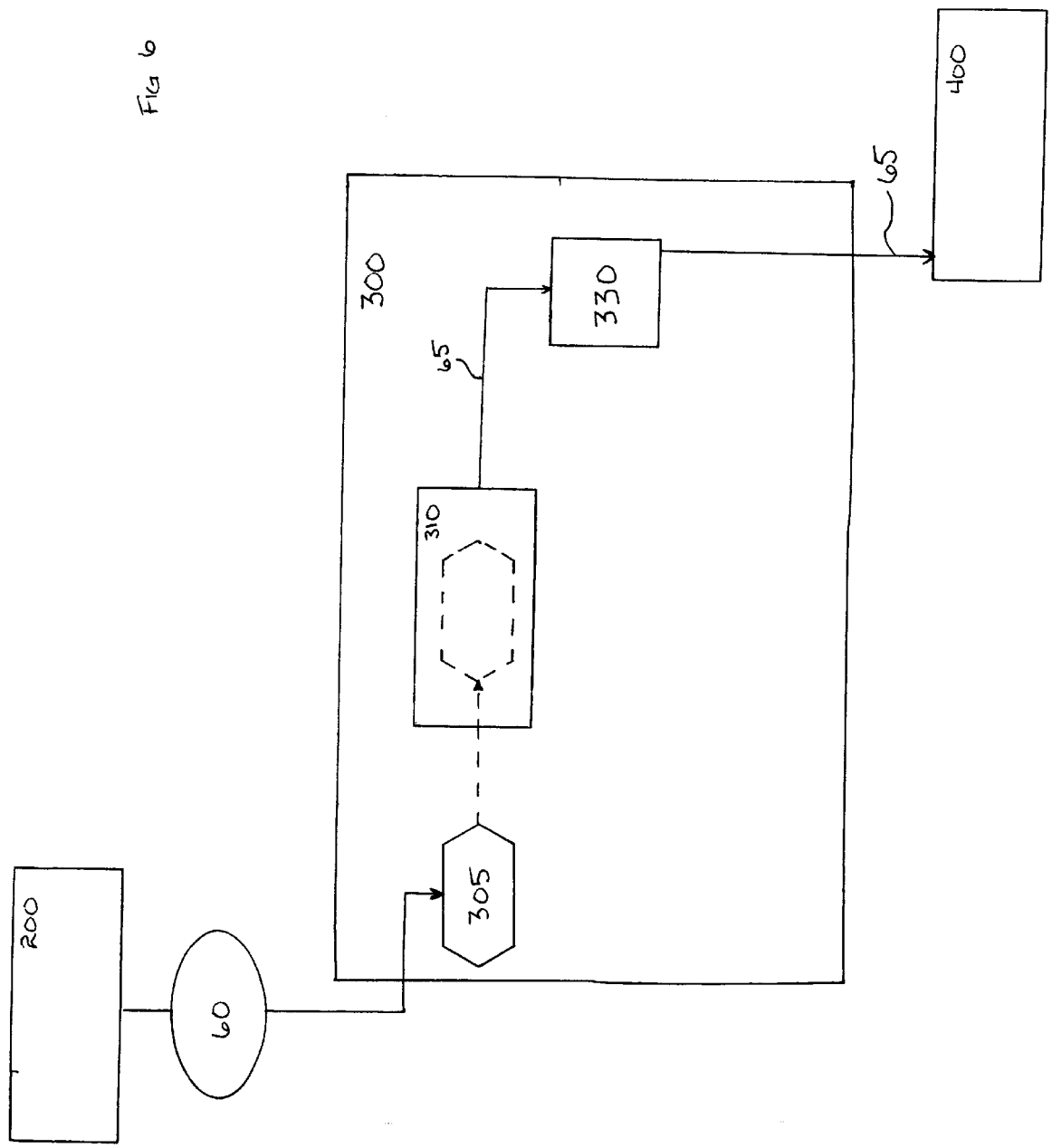

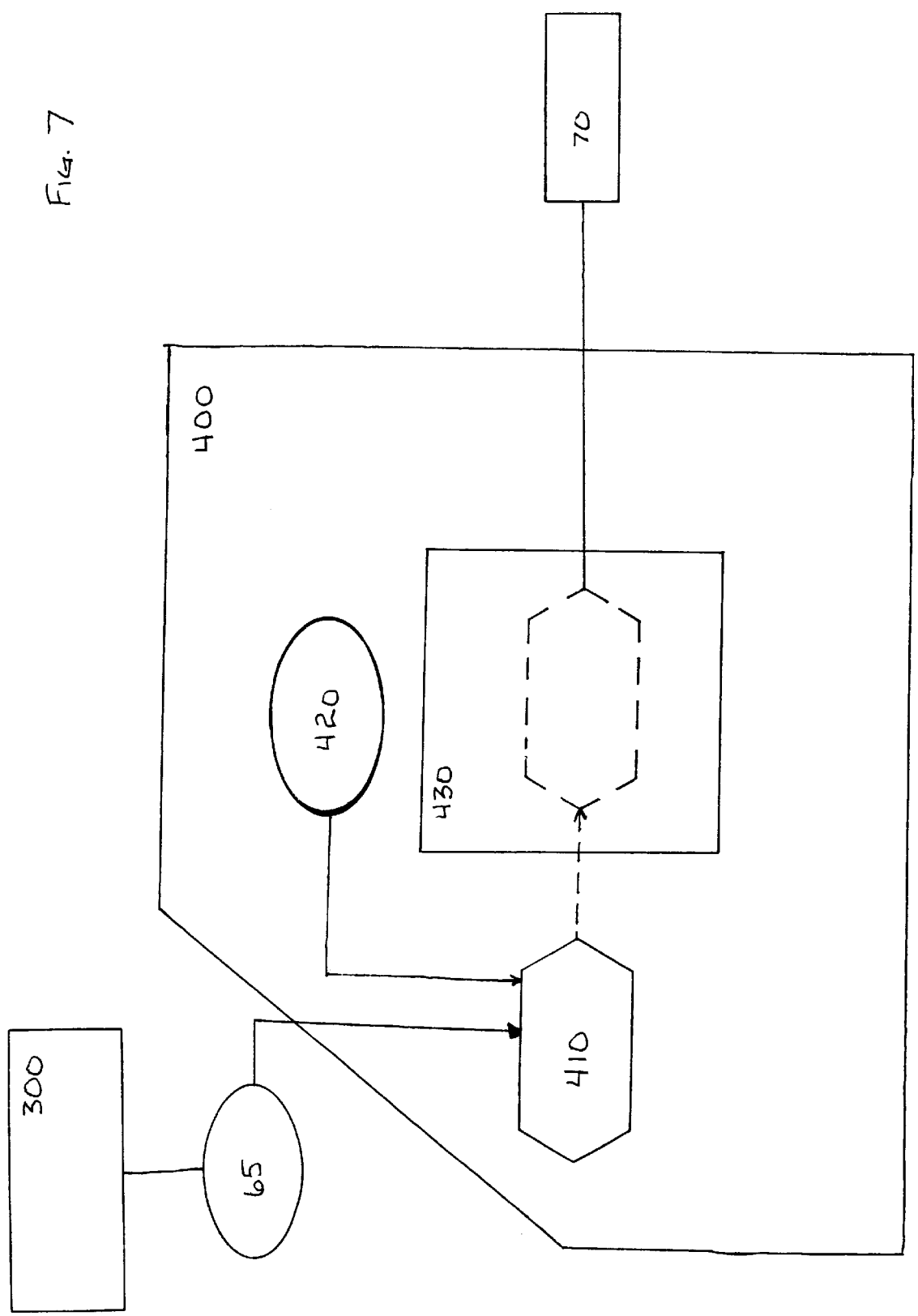

PROCESS FOR EXTRACTING QUANTITIES OF PRECIOUS METALS

BACKGROUND OF THE INVENTION

1. Field of the Invention

The present invention relates generally to the extraction of metals from materials. More specifically, the invention relates to the extraction of precious metals present in small quantities from particulate ore bodies, ore body derivative materials, residual industrial materials and the like.

2. State of the Art

The extraction of precious metals from ore bodies, ore body derivatives, or other materials containing trace quantities of precious metals is desirable where the extraction process is economically feasible and advantageous. Although precious metal rich materials are often targeted for precious metal recovery, millions of tons of material having trace amounts of precious metals are not processed using present methods of precious metal extraction for economic reasons. A economically feasible process could convert the millions of tons of material having small or undetectable amounts of precious metals from virtually worthless material into a valuable commodity.

A number of processes exist by which precious metals are extracted from materials containing measurable quantities of desired precious metals. One of the processes involves the combination of a precious metal containing material with molten metal, such as lead, copper, iron, or a mixture thereof. The molten metal binds with the precious metals. The molten metal is separated from any extraneous material in the mixture, along with the bound precious metals, and the metal mixture is cooled. Known extraction and separation techniques may be used to separate the various metals from the cooled metal mixture.

Another process involves slurry cyaniding, wherein precious metals are extracted from metal using cyanide. However, the waste from such methods is harmful and is expensive to neutralize. Thus, such processes are not economically feasible where the precious metals contained in the material are apparent only in trace or undetectable amounts.

Other processes also exist, but none provide an economical method by which barely detectable or undetectable amounts of precious metals may be recovered from precious metal bearing materials. Therefore, an economical process providing for the recovery of precious metals from ore bodies, or waste materials which have only trace amounts of precious metals, is desirable.

BRIEF SUMMARY OF THE INVENTION

The present invention comprises a process for extracting metals from ore bodies, residual materials resulting from industrial processes and other materials containing small, or trace, quantities of one or more metals. Precious metals such as noble metals, platinum, paladium, gold, and silver are examples of the types of metals which may be recovered using the present invention. The process of the invention is particularly suitable for use in extraction of precious metals from materials to which application of conventional precious metal extraction processes is inefficient or prohibitively expensive. Such materials are referred to herein generically, for the sake of convenience, as "target materials".

The process of the present invention includes the steps of mixing a target material in particulate form with particulate metal, such as copper, and a material containing hydrocarbon chains, roasting the mixture, and recovering precious metals from the roasted mixture. One suitable material containing hydrocarbon chains comprises whole wheat flour. Roasting may include induction roasting in an induction furnace as well as roasting within a hydrogen furnace. The recovery of the precious metals from the roasted material is usually accomplished through smelting.

Mixing the target material with copper and, for example, flour involves the grinding of the target material to a desired particulate size, or mesh size, and the mixing together of substantially equal amounts of the target material, finely ground copper, and coarsely ground flour. The target material/copper/flour mixture is then passed to the roasting stage of the process.

During the roasting stage of the process, the mixture may undergo a single roast or a series of roasts before the final smelting process. Typically, one or more roasts are conducted within induction furnaces operating at a high frequency such as, for example, about three thousand cycles per second (3 kHz). The mixture is placed into a container, such as a crucible, which is inserted into an induction furnace operating at a temperature below the melting point of copper, or below approximately 2200 degrees F. The mixture ignites, usually immediately upon entering the induction furnace. Upon cessation of substantial burning of the mixture in the induction furnace, the mixture is removed and cooled in a substantially oxygen-free environment. A sealed container may be used to hold the cooling mixture. Carbon dioxide may be circulated through the sealed container to facilitate the cooling process and maintain the oxygen-free environment.

If more than one induction roast is performed, the previously roasted mixture is re-ground and combined with additional flour or other hydrocarbon chain containing material, the amounts of such material in this step being varied as required for optimal results. The roasting step is then repeated.

Optionally, a roasting step in a hydrogen enriched environment may be performed. Such a hydrogen roast involves the grinding of the target material followed by a roast in a hydrogen furnace rather than an induction furnace. The target material is placed in boats which facilitate hydrogen contact with the target material during the hydrogen roast.

Following the completion of the last roast, whether it is a hydrogen roast or an induction roast, the mixture is ground and mixed with about twice its weight in borax. The borax-post roast mixture is then smelted, for example in an induction furnace, to retrieve the precious metals from the target material mixture. The peak smelting temperature is preferably between about 3800 degrees F. and 4000 degrees F.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings, in which:

FIG. 4 illustrates a container configuration to provide even heating of the target material;

FIG. 5 illustrates a container filled with a target material, having carbon rods inserted therein, as an alternate method of injecting electromagnetic fields in a first roasting stage;

FIG. 6 illustrates a flow diagram of an optional hydrogen roast stage of the process; and FIG. 7 illustrates a flow diagram of the smelting stage of the process.

DESCRIPTION OF THE ILLUSTRATED EMBODIMENTS

Figure 1:
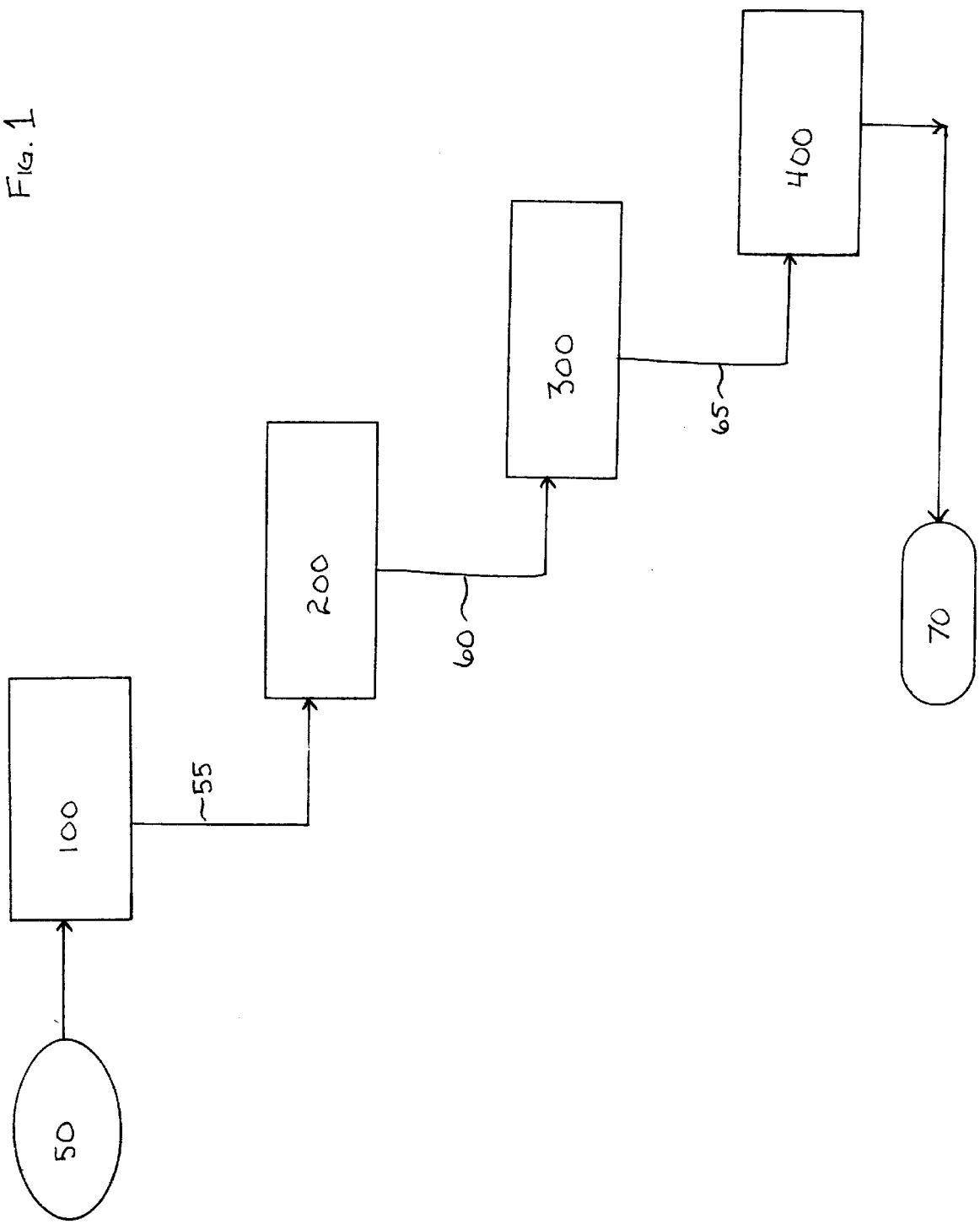
FIG. 1 illustrates a general process flow diagram of the present invention.

A general process sequence of the present invention is illustrated in FIG. 1. Target material 50 is passed to preparation stage 100. Prepared target material 55 is passed from the preparation stage 100 to a first roasting stage 200 where the prepared target material 55 is induction roasted at least once and undergoes physical and chemical changes. Upon completion of the first roasting stage 200, the induction-roasted target material 60 is passed to an optional second grinding and mixing operation. Following completion of the second grinding and mixing operation, an optional second roast, stage 300, in the form of a hydrocarbon roast further prepares target material 65 for a smelting process 400 where noble metals such as platinum group, gold, and silver are collected from target material 65. Although FIG. 1 illustrates a process involving a single induction roast and a single hydrogen roast, it is understood that other process sequences involving any combination of induction roasts and hydrogen roasts also fall within the spirit of the present invention.

Raw target material 50, for the purposes of defining this invention, refers to and includes any ore body or derivative of an ore body, such as mine extractions, fly ash, bottom ash from coal fired processes, mine tailings, coal ash, precipitants from various leaching solutions (including by way of example only, HCl/Cl, Bromine, cyanide, NaOH/KOH), pure elements, or any other material, such as a residual material from an industrial process, which may, but not necessarily, contain at least trace amounts of one or more precious metals. The inventive process is remarkable in its capability for extracting precious metals from target materials 50 in which the presence of precious metal may be barely detectable, or even undetectable, by conventional assaying techniques. Thus, the inventive process may be applied to economically extract precious metals from target materials 50 which were heretofore considered to be waste, or of minimal value.

The extraction of precious metals from target material 50 involves a sequence of stages or process steps, and the extraction process of the present invention is hereinafter described with respect to a presently preferred embodiment for extracting precious metals from the target material.

Figure 2:
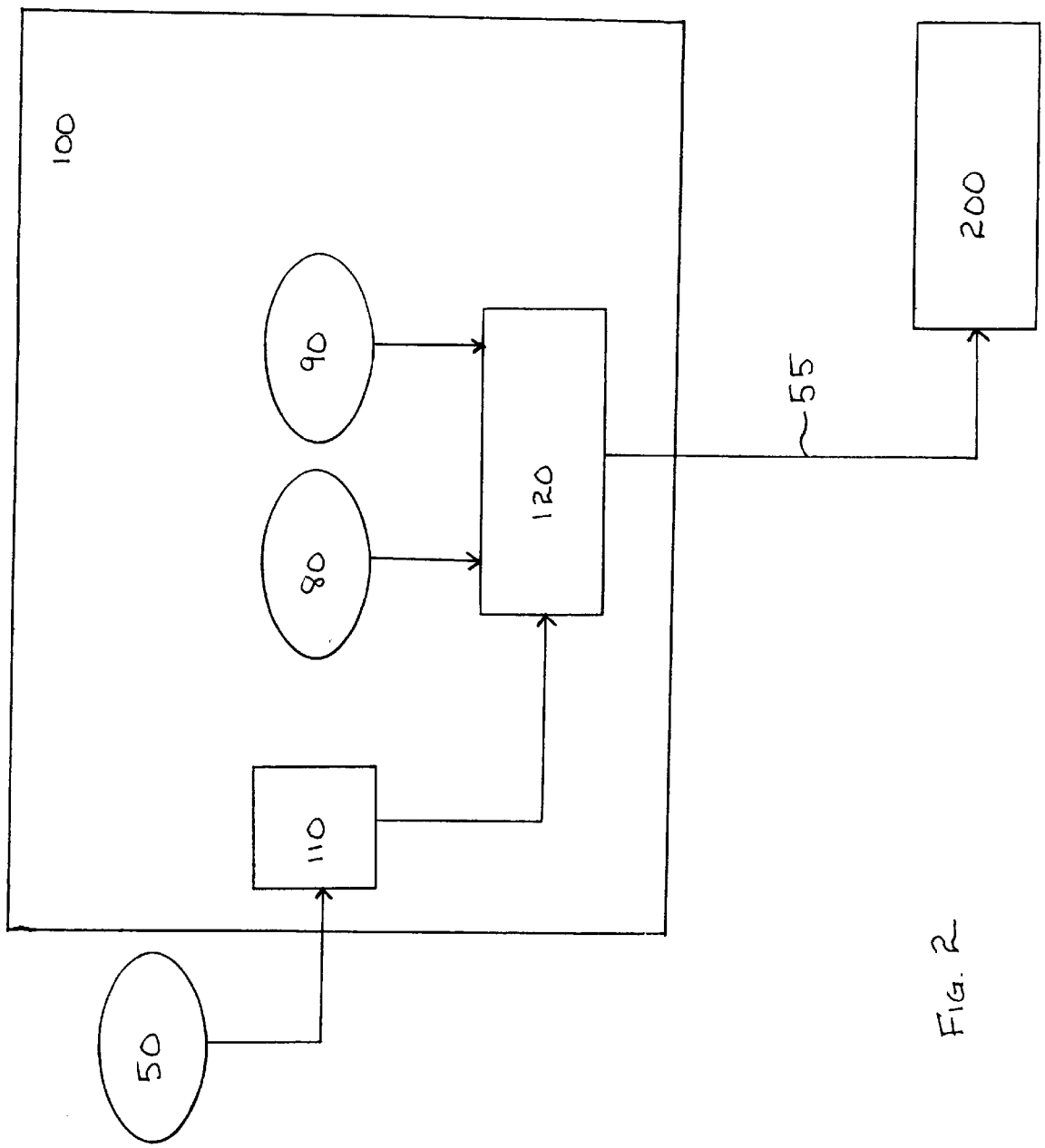
FIG. 2 illustrates a specific flow diagram of the preparation stage of the process.

The first stage of the process of the invention includes grinding and mixing of raw target material 50 into prepared target material 55. Conversion of the raw target material 50 to roasted target material 60 occurs in the roasting stage 200. FIG. 2 illustrates an exemplary flow diagram of the various steps in the preparation stage 100 to which the raw target material 50 is subjected to effect its conversion to prepared target material 55. The raw target material 50 entering the preparation stage 100 is fed into a grinder 110 where the raw target material 50 is ground to a pre-determined particle size, preferably not larger than one hundred mesh. It has been found that a raw target material 50 particle size of one hundred mesh or smaller is desirable to ensure that each particle of target material 50 is subjected to a complete and thorough reaction in subsequent processing. Although a particle size of one hundred mesh is desirable, it is not, however, a critical limitation because some effective conversion may take place with particle sizes larger than one hundred mesh.

Raw, particulate target material 50 from the grinder 110 is mixed with substantially equal portions, by weight, of copper 80 and flour 90. Thus, a one-to-one-to-one ratio of raw target material 50, copper 80 and flour 90 is combined and mixed in a mixer 120 to thoroughly mix the materials such that particles of each constituent are substantially in contact with particles of the other constituents. The mixture prepared in mixer 120 constitutes prepared target material 55, which is then fed to the first roasting 200 stage of the process. For example, if 227 grams of ground raw target material 50 are to be processed, it would be necessary to add 227 grams of copper 80 and 227 grams of flour 90 to the raw target material 50 and thoroughly mix the raw target material 50, copper 80 and flour 90 in the mixer 120. Although it has been found that a one-to-one-to-one ratio of raw target material 50, copper 80, and flour 90 is the preferred ratio, other ratios or combinations of these constituents may also effect some conversion and are considered within the scope of the present invention. Furthermore, a hydrocarbon material, rather than flour 90, may be substituted in the mixture of the prepared target material 55.

It is most preferable that the copper 80 combined with the raw target material 50 be almost pure, dendritic copper, or copper that is ground, or irregularly shaped. Copper 80 particles having a round or consistent shape are less desirable than irregular copper 80 particles having torn or jagged edges and surfaces, the latter providing enhanced surface area per unit weight for effecting greater conversion yield. Dendrite copper having a purity of about 999.0 to 999.9 is currently believed to provide the best yield of precious metals from the inventive extraction process. However, other purity values close to the desired purity may be used where copper 80 having a purity in a preferred range is unavailable. In addition to selecting an appropriate purity of the copper 80 used in the process, it is also necessary to select and employ an appropriate particle size of the copper 80. Particles of copper 80 having a mesh size of one hundred mesh or smaller are desired, and even finer particles are more desirable.

The flour 90 added to the raw target material 50 comprises flour 90 made from whole wheat. Although wheat in the form of flour is the preferred material, any suitable material containing hydrocarbon chains which may be broken with the application of heat and magnetic fields may be used. Plastics, other grains, and wood are examples of these kinds of materials, and may be referred to herein also as "hydrocarbon materials". Of course, if a material other than flour 90 is employed, the weight proportion of such other material may vary from that employed with flour 90. A coarse ground flour 90 is preferred over finely ground flour 90. Flour 90 providing a particle size distribution between about one hundred mesh to about twenty mesh fits this requirement.

Figure 3:
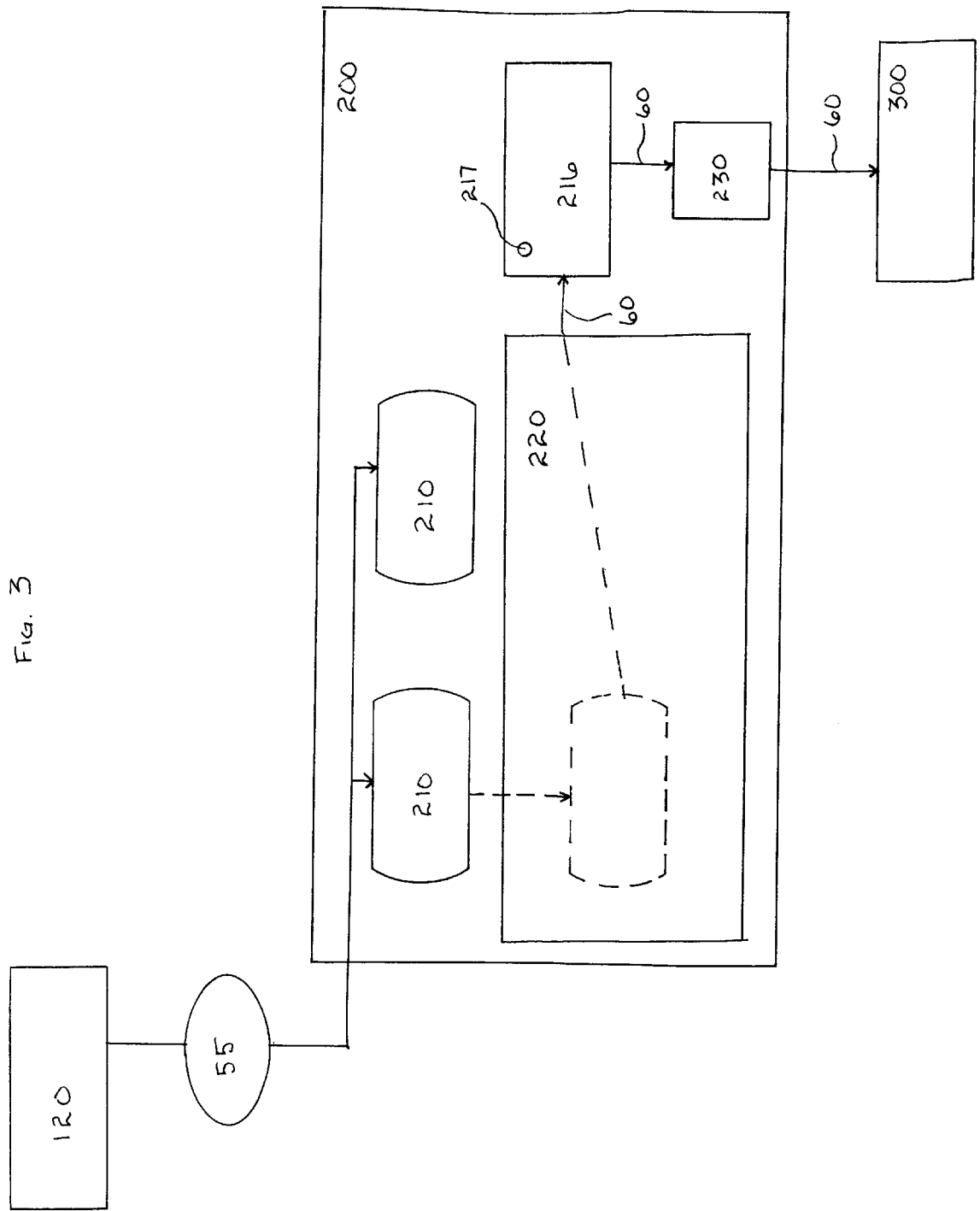
FIG. 3 illustrates a flow diagram of the first roasting stage of the present process.

FIG. 3 illustrates the components of the first roasting stage 200 of the process. The first roasting stage 200 begins with the transfer of the prepared target material 55 from the mixer 120 to one or more containers 210 these containers 210 are made of silicon carbide, which is a preferred material. Other containers 210 such as platinum, stainless steel, titanium, or other conductive material, which will withstand a minimum of 2500 degrees F., may be used and are within the spirit of the invention. However it has been shown that these other materials develop hot spots due to varying conductivity within the material or due to geometric placement with respect to the furnace coils in an induction furnace 220. Silicon carbide is much more forgiving as to these disadvantages, and is far cheaper than platinum. Containers 210 are used to hold the prepared target material 55 during an induction roasting process where the magnetic fields cause heat generation in the container walls, as well as penetrating through the target material 55. If a large quantity of prepared target material 55 requiring a container 210 with substantial volume is being processed at one time, a carbon rod 214 as shown in FIG. 4, or other conductive materials as previously mentioned, may be inserted into the prepared target material 55 within the container 210. Multiple carbon rods 214 may also be used as illustrated in FIG. 5. The placement of multiple carbon rods 214 as in FIG. 5 in the container 210 allows the formation of a conductive circuit which facilitates the heating of the target material 55. These methods are desirable to facilitate even temperature distribution throughout the prepared target material 55 during induction roasting. If a carbon rod 214, or any other materials capable of forming a conductive circuit, are used to ensure even heating throughout the prepared target material 55 they should be located and oriented to be no further than about eight inches from the side wall of the container 210.

As depicted in FIG. 3, prepared target material 55 is placed within a container 210 in an induction furnace 220 which is preheated to ignition temperature of the flour 90, then raised to just below the melting point of copper 80, or about 2200 degrees F. The prepared target material 55 within the container 210 ignites immediately due to the presence of the flour 90, producing a flame which is present throughout the roast. As the flour 90 in the prepared target material 55 burns, hydrogen gas is released from the breaking of hydrocarbon chains of the flour 90. The hydrogen gas reacts with the raw target material 50 and copper 80 comprising the remainder of prepared target material 55. In addition, the burning of the prepared target material 55 forms carbon and carbon monoxide, both of which facilitate reduction of precious metals contained within the prepared target material 55 to a converted state. As combustible material is depleted from the prepared target material 55, the burning flame gradually subsides and the roasting of the prepared target material 55 is substantially complete when the flame is barely detectible. The flame commences as a blue, blue-green, or even yellow-blue-green color, and toward the end of the burn changes to a very light blue, being barely visually detectable. The roasted target material 60 is then removed from the induction furnace 220, and cooled in an oxygen depleted atmosphere. An exemplary roast time for 227 grams of raw target material 50 is about 45 minutes, with the roasted target material 60 being removed from the container 210 about 5 minutes before burning ceases. It should be noted, however, that the roast time will vary with the volume of material being roasted, a longer roast time being required for a larger volume.

An induction furnace 220 is used, in combination with the burning flour 90, to produce an oxygen-free and hydrogen rich environment for the roast of the prepared target material 55. Oxidation of the prepared target material 55 is undesirable because the materials are converted back to an oxide state which stops the conversion process of the invention and may even reverse it. A gas furnace should not be used in place of an induction furnace 220, as the former does not provide the required oxygen-free status, nor does it provide the desired frequencies of the changing magnetic fields.

Induction furnaces 220 used in the induction roasting stage 200 may be operated at a drive frequency between one thousand cycles per second (1 kHz) and ten thousand cycles per second (10 kHz), with a drive frequency of at least three thousand cycles per second (3 kHz) being more preferred. Although there may be some conversion of prepared target material 55 at below three thousand cycles per second (3 kHz), yields of precious metals when roasted within induction furnaces 220 operating outside of frequencies ranging upwardly from about three thousand cycles per second (3 kHz) to about ten thousand cycles per second (10 kHz) will be minimal. Optimized individual metal yields, including those within the noble metals group, may be enhanced by selection of proper frequencies within the band mentioned above.

It is necessary that the temperature of the container 210 in the induction furnace 220 be maintained below the melting point of copper 80. If the temperature within the induction furnace 220 rises above the melting point of copper 80, the desired conversion in the prepared target material 55 does not occur due to the melting of copper 80. Therefore, the roast of the prepared target material 55 within the induction furnace 220 should be monitored closely.

Following the roast, the roasted target material 60 is cooled. Preferably, cooling of the roasted target material 60 is carried out in an oxygen-free environment. The roasted target material 60 is transferred from a container 210 to a sealed container 216 after substantially complete cessation of the burning of the flour 90. Substantially complete cessation of the burning of the flour 90 is evidenced by the lack of a discernable flame on or within the target material 55 within the induction furnace 220. The sealed container 216 may have at least one opening 217 for the introduction of carbon dioxide into the interior thereof. Introduction of carbon dioxide helps to prevent re-oxidation of the target material 60 while it is still hot.

Once the roasted target material 60 has cooled sufficiently, it is transferred to a grinder 230 where it is ground into particles having a size of one hundred mesh or smaller. The re-ground, roasted target material 60 may then be cycled through a second induction roasting process similar to the first roast. It has been found that a second induction roast may be advantageous for some target materials. Likewise, a third or subsequent series of induction roasts may also help increase the yield of precious metals in the final product, depending upon the constituency of the target material. However, it has been established that too many induction roasting steps may also drive the yield of precious metals toward a less precious metal such as silver, rather than, preferably, gold and platinum. It is also presently believed that a single induction roast, carried out at a frequency higher than three thousand cycles per second (3 kHz), may provide a yield comparable to that of two roasts at a lower frequency.

If a second, or subsequent roast step is performed with roasted target material 60 it is similar to the first roast step, the only difference being the makeup of the material subject to the roast. Prior to a second roast, the re-ground, roasted target material 60 is again mixed with flour 90 or another suitable hydrocarbon material as previously referenced. Instead of a ratio of one portion by weight of flour 90 equal to the weight of the re-ground, roasted target material 60, the same amount by weight of flour 90 which was used in the first roast mixture is added to the re-ground, roasted target material 60. Thus, in the example described above, the re-ground, roasted target material 60 resulting from the first induction roast, regardless of weight, would be added to an additional 227 grams of flour 90 and thoroughly mixed. The mixture of re-ground, roasted target material 60, and flour 90 is transferred to a container, or multiple containers, 210, each of which is placed in an induction furnace operating at previously mentioned frequencies, and at a temperature just below the melting point of copper 80. The roasting process is then carried out just as the process explained above. As with the first induction roast, the time of the second roast will depend on the time required to completely burn the additional flour added (no discernable flame).

It has been found that if a second induction roast is used in the process, particles of the second roast mixture should not be mixed with particles from the first induction roast mixture in further processing. To avoid mixing problems, it is suggested that different grinders 110, 230, 330 be used for grinding the initial raw target material 50, the roasted target material 60 from the first roast, the roasted target material 60 from any subsequent roasts, and the roasted target material 65 from a hydrogen roast. This approach eliminates cross-contamination problems during the grinding steps in the process, which may decrease precious metal yields. Likewise, separate containers 210 may be used for the first induction roast and any subsequent induction roasts to prevent a cross-contamination of target material.

Completion of a second induction roast, if one is used, is followed again by a cooling period in a sealed container 216 into which carbon dioxide may be introduced to maintain an oxygen-free environment and to facilitate cooling. Following the cooling, the target material 60 is transferred to a grinder 230 where it is reduced to particles having a mesh size of about one hundred or less. As noted above, a different grinder than grinder 110 is also preferred for this grinding process in order to prevent cross-contamination of material from different roasts.

Although not absolutely required for process function, it has been shown that yields of noble metals may be increased by roasting the target material 60 in a hydrogen atmosphere. When a hydrogen roast is added to the process, as shown in FIG. 6, stage 300, the roasted particulate (i.e. ground) target material 60 is transferred into boats 305 which are placed within the hydrogen furnace 310. The boats 305 are configured in such a manner to allow the hydrogen in the hydrogen furnace 310 to permeate the roasted, particulate target material 60 in the boats. Typically, the boats 305 are of a material capable of withstanding temperatures in excess of 900 degrees C., such as stainless steel or graphite for example. The boats 305 are shaped to fit within the hydrogen furnace 310 and configured to allow hydrogen to permeate throughout the roasted target material 60 contained within the boats 305. Further, it is presently believed that the boats 305 should be filled to a depth not in excess of four (4) inches to facilitate such penetration. Of course, it is understood that the depth of the target material 60 in the boats 305, and the size of the boats 305, may vary with the capacity of the hydrogen furnace 310.

The preferred embodiment of the hydrogen furnace 310 is to surround the heating chamber with an induction coil to provide both heating and magnetic fields within the target material 60. The length of time to which the roasted target material 60 is exposed to the environment within the hydrogen furnace 310 varies depending upon the size of the boats 305 and the amount of roasted target material 60 being processed. It has been found that the hydrogen roast stage 300 is finished in about two hours at full temperature. The amount of time required for the hydrogen roast may vary with the volume of material being roasted. The hydrogen furnace 310 is preferably a closed and contained furnace having a hydrogen atmosphere for the roast. An operating hydrogen furnace 310 temperature of about 850 to 900 degrees C. is preferred, and about 900 degrees C. is most preferred, during the hydrogen roast stage 300.

Following completion of any roasting processes, the number of which is determined by maximal conversion and whether the hydrogen roast stage 300 is used, the roasted target material, either 60 or 65, is ground in a grinder 230 or 330 respectively (depending upon whether a second induction roast has been conducted), to a particle size of one hundred mesh or smaller. The ground roasted target material 60 or 65 is mixed with borax 420 in a container 410 and smelted to recover the precious metals. The borax 420 may be in the form of borax powder or borax glass beads. Typically, the smelting 400 stage of the process involves the combination of the ground roasted target material 60 or 65 with about twice its weight in borax 420, erring on the side of excess borax 420, as depicted in FIG. 7. For example, 600 grams of roasted target material 60 or 65 may be mixed with about 1300 grams of borax 420. The mixture is then smelted to recover the precious metals. The smelting 400 stage is typically operated in an induction furnace 430 wherein the temperature is raised to a peak temperature of about 3800 degrees F. to about 4000 degrees F., which has been found to be suitable for collecting gold, silver and platinum group metals within a copper matrix.

Smelting 400 is completed by pouring the molten metal 70 into bars, from which the precious metals, now in significant quantities and in substantially pure form, may be extracted by known processes, such as electrical-refining. Additional precious metal yields may be obtained by hydrogen roasting the slimes from the electrical-refining process with the same parameters previously mentioned for a hydrogen roast.

It has also been found that larger amounts of platinum group metals and gold may be obtained if an in-courting step is undertaken prior to smelting. In-courting is the addition of a small amount of precious metals to a mixture which is to be smelted. Typically, in-courting small amounts of the metals desired from the process tends to increase the amount of those metals actually recovered during the smelting process. For example, if prior to the smelting step 400, 1.5 grams of gold, 1.5 grams of platinum, 1.5 grams of paladium and 1.5 grams of silver are added to the ground roasted target material 60 or 65, the amounts of the respective precious metals recovered from the beginning 227 gram target material 50 may be improved by up to two times over the typical recovery achieved without in-courting.

Altitude has been shown to be a factor in performing the inventive process, in that higher altitudes decrease yield. A significantly decreased yield is experienced at an altitude of 2000 feet, decreasing steadily with increasing altitude.

The present invention involves the visible conversion of a target material containing substantially imperceptible quantities of precious metals into a material wherein such metals are clearly perceptible under a 200× microscope equipped with a good ring light. This conversion takes place during the series of roasts that may be applied.

The term conversion, as has been previously used in the description of the illustrated embodiments of this invention, is used to describe a probable low energy fusion process in which the nucleus of a light element fuses with the nucleus of another light element to form the nucleus of a heavier element. The reason for postulating this type of reaction is that careful analysis has shown no amounts, other than possibly trace amounts, of the noble metals present in the feed material to the process. After the process is complete careful analysis shows substantial amounts (some times running to thousands of ounces per ton) in the finished metal without adding any of the noble metals to any part of the process system.

The reaction vessel 210, such as is shown in FIG. 3 provides a complex environment that includes, but may not be limited to:

1. Heat generated through coupling energy from the furnace coil into the reaction vessel that becomes a shorted transformer turn;

2. Exposure of the contents of the reaction vessel to an intense varying magnetic fields at certain critical frequencies that are generated by the currents circulating in the furnace coils and in the walls of the reaction vessel; and 3. Opposing fields generated by currents traveling in both directions along the helical transmission lines formed by the furnace coil and penetrating the reaction vessel.

After formulating the well known equations governing electromagnetic fields, James Clerk Maxwell solved the equations with quaternians. This mathematical approach resulted in forming field vectors that had not only magnitude and direction, but a scaler quantity representing potential as well. A simplified explanation of the significance of this approach is the example of two fields of equal magnitude but opposite direction interacting with each other. Using quaternians, the solution is a field with zero magnitude, no direction, and a scaler potential having a magnitude of two times the magnitude of the opposing fields. In an attempt to simplify the mathematical calculations used in electromagnetic field theory, Heavyside threw out the scaler results obtained with quaternians by reasoning that only the vector magnitudes and directions were of significance, thus greatly simplifying vector mathematics. This approach has become the method commonly used in electromagnetic field theory by science today. If we return to the original way Maxwell computed fields and consider the scaler quantities as localized metric potentials then it becomes possible to change the general space time metric within a localized space. It can be shown that nuclear binding forces, and therefore, nuclear reaction threshold, theoretically change if the space time metric changes. This may explain how it may be possible to provide a localized environment in which low energy nuclear fusion reactions could take place. A famous experiment in which chickens were fed only potassium yet continued to produce eggs with calcium shells indefinitely, shows that there are indeed low energy nuclear reactions in nature. One possible reaction of this type might be fusion of 5 Cu yielding 2 Au+45 H+two neutrons. This may occur in the present invention as there is a relatively large amount of carbon present near the end of the roast which would moderate the neutrons, thus providing slow neutrons for other reactions involving the lighter elements.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method of treating a target material, comprising:
   providing a target material;
   forming a first mixture by mixing said target material with a copper containing metal in a particulate form and a hydrocarbon material; and
   roasting said first mixture.

2. The method of claim 1 wherein said roasting said first mixture is conducted in an induction furnace.

3. The method of claim 1 further comprising providing said target material in particulate form.

4. The method of claim 1 further comprising providing said hydrocarbon material in particulate form.

5. The method of claim 1 further comprising:
   adding borax to said roasted first mixture; and
   smelting said borax and said roasted first mixture.

6. The method of claim 1 further comprising:
   grinding said roasted first mixture;
   mixing a hydrocarbon material with said ground roasted first mixture to form a second mixture; and
   roasting said second mixture.

7. The method of claim 6 wherein said roasting said second mixture is conducted in an induction furnace.

8. The method of claim 6 further comprising:
   adding borax to said roasted second mixture; and
   smelting said borax and said roasted second mixture.

9. The method of claim 6 further comprising providing said hydrocarbon material for said second mixture in particulate form.

10. The method of claim 6 further comprising:
    grinding said roasted second mixture;
    mixing a weight unit of hydrocarbon material with said ground, roasted second mixture to form a third mixture; and
    roasting said third mixture.

11. The method of claim 10 wherein said roasting of said third mixture is conducted in an induction furnace.

12. The method of claim 10 further comprising:
    adding borax to said roasted third mixture; and
    smelting said borax and said roasted third mixture.

13. The method of claim 10 further comprising:
    grinding said roasted third mixture to form a ground mixture; and
    roasting said ground mixture.

14. The method of claim 13 further comprising:
    adding borax to said roasted ground mixture; and
    smelting said borax and said roasted ground mixture.

15. The method of claim 13 wherein said roasting said ground mixture is conducted in a hydrogen furnace.

16. The method of claim 6, further comprising:
    grinding said roasted second mixture; and
    roasting said ground, roasted second mixture.

17. The method of claim 16 wherein said roasting said ground, roasted second mixture is conducted in a hydrogen furnace.

18. The method of claim 1, further comprising:
    grinding said roasted first mixture; and
    roasting said ground, roasted first mixture.

19. The method of claim 18 wherein roasting said ground, roasted first mixture is conducted in a hydrogen furnace.

20. The method of claim 1, wherein said providing a target material, comprises providing a weight unit of target material selected from the group consisting of ore, mine extractions, fly ash, bottom ash from coal fired processes, mine tailings, coal ash, leaching precipitants, residual industrial materials and material comprising a trace amount of at least one metal.

21. A method of treating a target material, comprising:
    providing a weight unit of target material in particulate form;
    forming a first mixture by mixing said weight unit of target material in particulate form with a weight unit of copper in a particulate form and a weight unit of hydrocarbon material;

roasting said first mixture; and grinding said roasted first mixture.

22. The method of claim 21 wherein said roasting said first mixture is conducted in an induction furnace.

23. The method of claim 21 wherein said hydrocarbon material is in particulate form.

24. The method of claim 21 further comprising roasting said ground roasted first mixture in a hydrogen furnace.

25. The method of claim 21 further comprising:

adding borax to said ground, roasted first mixture; and smelting said borax and said ground, roasted first mixture.

26. The method of claim 21 further comprising:

mixing a weight unit of hydrocarbon material with said ground, roasted first mixture to form a second mixture; and roasting said second mixture.

27. The method of claim 26 wherein said roasting of said second mixture is conducted in an induction furnace.

28. The method of claim 26 further comprising:

grinding said roasted second mixture;

mixing a weight unit of hydrocarbon material with said ground, roasted second mixture to form a third mixture; and roasting said third mixture.

29. The method of claim 28 wherein roasting of said third mixture is conducted in an induction furnace.

30. The method of claim 26 further comprising:

grinding said roasted second mixture; and roasting said ground, roasted second mixture to form a smelting mixture.

31. The method of claim 30 wherein said roasting said ground, roasted second mixture is conducted in a hydrogen furnace.

32. The method of claim 30 further comprising:

grinding said smelting mixture;

adding borax to said ground, smelting mixture; and smelting said borax and said ground, smelting mixture.

33. The method of 21 wherein said hydrocarbon material comprises flour.

34. The method of claim 21 wherein said hydrocarbon material comprises plastic.

35. The method of claim 21 wherein said hydrocarbon material comprises wood.

36. The method of claim 21, wherein said providing a weight unit of target material in particulate form, comprises providing a weight unit of target material selected from the group consisting of ore, mine extractions, fly ash, bottom ash from coal fired processes, mine tailings, coal ash, leaching precipitants, residual industrial materials and material comprising a trace amount of at least one metal.

37. A method of treating a target material, comprising:

providing a weight unit of target material in particulate form;

mixing said weight unit of target material in particulate form with a weight unit of particulate copper and a weight unit of flour;

roasting the mixture of target material, copper and flour in an induction furnace;

transforming the induction-roasted mixture into particulate form;

roasting the transformed, induction-roasted mixture in a hydrogen environment;

transforming the hydrogen-roasted mixture into particulate form;

adding borax to the transformed, hydrogen-roasted, particulate mixture; and smelting the hydrogen-roasted, particulate mixture in combination with the borax.

38. The method of claim 37 wherein said providing a weight unit of target material in particulate form comprises grinding a weight unit of target material into particles of a mesh size of no more than about one hundred.

39. The method of claim 37 further comprising providing said particulate copper as copper particles of a mesh size of no more than about one hundred.

40. The method of claim 39 further comprising providing said particulate copper of a purity of between about 999.0 and about 999.9.

41. The method of claim 39 further comprising providing said particulate copper comprising dendritic copper.

42. The method of claim 39 further comprising providing said particulate copper comprising flat, irregular shaped copper particles.

43. The method of claim 37 further comprising providing said flour as coarsely ground flour.

44. The method of claim 43 further comprising providing said flour comprising wheat flour.

45. The method of claim 43 further comprising providing said flour as particles having a mesh size between about one hundred and about twenty.

46. The method of claim 37 further comprising operating the induction furnace at a frequency of between about one thousand and about ten thousand cycles per second (1 kHz and 10 kHz).

47. The method of claim 37 further comprising operating the induction furnace at a frequency of about three thousand cycles per second (3 kHz).

48. The method of claim 37 further comprising maintaining an internal temperature of the induction furnace below the melting point of copper during the roasting therein.

49. The method of claim 37 wherein transforming the induction-roasted mixture into particulate form comprises grinding the induction-roasted mixture into particles having a mesh size of no more than about one hundred.

50. The method of claim 37 wherein said roasting the transformed, induction-roasted mixture in a hydrogen environment comprises roasting the transformed mixture in a hydrogen furnace.

51. The method of claim 50 further comprising operating the hydrogen furnace at a temperature between about 850 degrees C. and about 900 degrees C.

52. The method of claim 50 further comprising roasting the transformed, induction-roasted mixture in the hydrogen furnace for about one to about three hours.

53. The method of claim 37 wherein transforming the hydrogen-roasted mixture into particulate form comprises grinding the hydrogen-roasted mixture into particles having a mesh size of no more than about one hundred.

54. The method of claim 37 wherein said adding borax to said transformed, hydrogen-roasted mixture comprises adding an amount of borax substantially equal to about two times the weight of the transformed, hydrogen-roasted mixture to the transformed, hydrogen-roasted mixture.

55. The method of claim 37 further comprising smelting the hydrogen-roasted, particulate mixture in combination with the borax in an induction furnace.

56. The method of claim 55 further comprising operating the induction furnace during the smelting at a temperature between about 3800 degrees F. and about 4000 degrees F.

57. The method of claim 55 further comprising smelting within said induction furnace for a period of about 45 minutes to about 210 minutes.

58. The method of claim 37 wherein said target material is selected from the group consisting of ore, fly ash, bottom ash from coal fired processes, mine tailings, precipitates from leach solutions and pure elements.

59. The method of claim 37 wherein said roasting said mixture of target material, copper and flour in an induction furnace exposes said mixture to an environment wherein heat is generated through coupling energy from an induction furnace coil in said induction furnace and transferred to a wall of a reaction vessel comprising a shortened transformer turn, wherein said reaction vessel contains said mixture of target material.

60. The method of claim 59 wherein said roasting said mixture of target material, copper and flour in an induction furnace exposes said mixture to an environment wherein an intense magnetic field varying at critical frequencies is generated by currents in at least one of said walls of said reaction vessel and said induction furnace coil.

61. The method of claim 59 wherein said roasting said mixture of target material, copper and flour in an induction furnace exposes said mixture to an environment wherein opposing electrical fields are generated along a helical transmission line formed by said furnace coil such that a magnitude and direction of said opposing fields is canceled, to create a scaler potential within said vessel.

62. The method of claim 37, further comprising, extracting precious metals from said smelted, hydrogen-roasted, particulate mixture.

63. A method of treating a target material, comprising:

obtaining a unit of target material having a defined weight;

grinding the unit of target material into particles having a size of one hundred mesh or less;

forming a mixture comprising mixing a weight unit of target material, a weight unit of coarsely ground wheat flour, and a weight unit of copper, said copper comprising a plurality of dendritic copper particles of a purity of about 999.5 and having a size of no more than about one hundred mesh or smaller;

performing a first induction roast upon said mixture, said induction roast comprising filling a container with the mixture, inserting the container into a preheated induction furnace to ignite the mixture, roasting the mixture in the induction furnace at a temperature below the melting point of copper until combustion exhibited by the mixture substantially subsides, transferring the mixture to a sealed container, and cooling the mixture in the sealed container;

grinding the cooled mixture from the first induction roast into particles having a mesh size of no more than about one hundred mesh;

performing a hydrogen roast upon an at least once induction roasted mixture comprising transferring the at least once induction roasted, ground mixture into a container, placing the container into a hydrogen furnace, roasting the at least once induction roasted mixture in said hydrogen furnace at a temperature of about 850 to 900 degrees C. for a period of about 2 hours to about 4 hours;

grinding the mixture resulting from the hydrogen roast into particles having a mesh size of no more than about one hundred mesh;

combining with the ground mixture resulting from the hydrogen roast an amount of borax, by weight of at least two times the weight of the resulting mixture, placing the borax and final mixture into a crucible, inserting the crucible into an induction furnace operating at a temperature of between about 3800 degrees F. and about 4000 degrees F. for about 45 minutes to about 3 hours.

64. The method of claim 63 further comprising, before performing the hydrogen roast:

mixing the ground, roasted mixture from the first induction roast with a said weight unit of coarsely ground wheat flour to form a second mixture;

performing a second induction roast on the second mixture, said second induction roast comprising filling a container with the second mixture, inserting the container into a preheated induction furnace to ignite the second mixture, roasting the second mixture in the induction furnace at a temperature below the melting point of copper until combustion exhibited by the second mixture substantially subsides, transferring the second mixture to a sealed container, and cooling the second mixture in the sealed container; and grinding the cooled, roasted second mixture from the second induction roast into particles having a mesh size of no more than about one hundred mesh.

65. The method of claim 63, wherein said obtaining a unit of target material having a defined weight, comprises obtaining a unit of target material selected from the group consisting of ore, mine extractions, fly ashy bottom ash from coal fired processes, mine tailings, coal ash, leaching precipitants, residual industrial materials and material comprising a trace amount of at least one metal.

* * * * *

UNITED STATES PATENT AND TRADEMARK OFFICE
CERTIFICATE OF CORRECTION

PATENT NO.    : 6,461,400 B1                                         Page 1 of 1
DATED         : October 8, 2002
INVENTOR(S)   : Art J. Parker It is certified that error appears in the above-identified patent and that said Letters Patent is hereby corrected as shown below:

Column 6,
Line 32, after "thereof" and before "Introduction" insert -- . --

Column 14,
Line 4, change "ashy" to -- ash, --

Signed and Sealed this

Nineteenth Day of August, 2003

JAMES E. ROGAN
*Director of the United States Patent and Trademark Office*